United States Patent [19]

Jorgensen et al.

[11] Patent Number: 5,174,749
[45] Date of Patent: Dec. 29, 1992

[54] METHOD AND APPARATUS FOR HEAT TREATMENT OF PULVEROUS MATERIAL

[75] Inventors: Bjarne M. Jorgensen; Erik Neubert, both of Copenhagen, Denmark

[73] Assignee: F. L. Smidth & Co. A/S, Copenhagen, Denmark

[21] Appl. No.: 724,922

[22] Filed: Jul. 2, 1991

[30] Foreign Application Priority Data

Jul. 11, 1990 [DK] Denmark .............................. 1669/90

[51] Int. Cl.⁵ .............................................. F27B 1/02
[52] U.S. Cl. ..................................... 432/106; 432/14; 432/58
[58] Field of Search ............... 432/106, 58, 14

[56] References Cited

U.S. PATENT DOCUMENTS

| | | | |
|---|---|---|---|
| 3,393,625 | 7/1968 | Takach | 454/159 |
| 3,472,146 | 10/1969 | Mazurkiewicz | 454/159 |
| 3,750,556 | 8/1973 | Duke et al. | 454/159 |
| 3,932,117 | 1/1976 | Ritzmann | 432/106 |
| 4,004,876 | 1/1977 | Sylvest | 432/106 |
| 4,088,438 | 5/1978 | Deussner et al. | 432/106 |
| 4,118,177 | 10/1978 | Weber et al. | 432/58 |
| 4,381,916 | 5/1983 | Warshawsky | 432/106 |
| 4,408,714 | 10/1983 | Kobayashi | 236/13 |
| 4,467,706 | 8/1984 | Batcheller et al. | 454/70 |
| 4,470,849 | 9/1984 | Abelitis et al. | 432/106 |
| 4,560,103 | 12/1985 | Schulz et al. | 236/13 |
| 4,685,508 | 8/1987 | Iida | 165/43 |
| 4,708,644 | 11/1987 | Lawall et al. | 432/106 |
| 4,759,269 | 7/1988 | Brown et al. | 165/42 |
| 4,819,715 | 4/1989 | Kobayashi | 165/43 |
| 4,858,676 | 8/1989 | Boltik et al. | 165/43 |
| 4,929,178 | 5/1990 | Maury et al. | 432/106 |
| 4,955,986 | 9/1990 | Maury et al. | 432/106 |
| 5,086,830 | 2/1992 | Heinle et al. | 165/43 |

FOREIGN PATENT DOCUMENTS 2550469 12/1987 Fed. Rep. of Germany .
1463124 2/1977 United Kingdom .

Primary Examiner—A. Michael Chambers
Attorney, Agent, or Firm—Brumbaugh, Graves, Donohue & Raymond

[57] ABSTRACT

By a method for heat treatment of pulverous material, e.g. burning of lime, the lime is first preheated by means of exit gas in a preheater (1, 2, 3) and subsequently burnt in a calciner (4, 14), after which the burnt lime is cooled in a cooler (6, 7).

In order to be able to alter the reactivity of the finish-burnt lime, the calciner is divided into two chambers, namely a first chamber (4) in which the lime is burnt at, e.g. 1050° C. and a second chamber (14) in which a larger or smaller portion of the lime is further burnt at a higher temperature, e.g. 1300° C.

By means of a splitting gate (16) in the outlet from a separation cyclone (5) for the calciner (4, 14), it is possible to determine the size of the portion of lime which should be exposed to the higher burning temperature in the second calciner chamber (14) and consequently to predetermine the reactivity of the finish-burnt lime.

6 Claims, 2 Drawing Sheets

METHOD AND APPARATUS FOR HEAT TREATMENT OF PULVEROUS MATERIAL

BACKGROUND OF THE INVENTION

This invention relates to a method for heat treatment of pulverous material in an apparatus comprising a preheater, e.g. a suspension preheater, a suspension calciner with two chambers and a cooler, e.g. a suspension cooler, by which method the material is preheated in the preheater by means of exit gas from the heat treatment, being burnt in the calciner and cooled in the cooler by air being used as combustion air in the calciner.

Lime burning in a suspension calciner, a so-called Gas Suspension Calciner, of the above type is known from the British Patent No. 1,463,124.

A method of the above kind and the appertaining apparatus is known from the description of the German patent DE 25 50 469. According to this patent the usage of two chambers in the calciner will provide optimum burning conditions when the apparatus is used for burning different materials. All material which is burnt in the apparatus is led through both chambers of the calciner.

The operating principle of this known apparatus corresponds to an apparatus, of which the present invention is a further development, and which is described in detail in the magazine ZEMENT-KALK-GIPS, vol. 10/1980, pages 4935–497, and also shown in the enclosed FIG. 1.

The mentioned magazine article describes a typical industrial plant for lime burning, comprising a 3-stage cyclone preheater in which the raw material is preheated by means of the exit gas from the calciner which is equipped with a separation cyclone in which the burnt material is separated from the exit gas and transported to a 2-stage cyclone cooler.

However, one characteristic of a method and plant of this type is that the finish-burnt lime is normally highly reactive. Although such high reactivity may be advantageous in certain cases, it is a disadvantage in other cases.

For instance, burnt lime is used to produce milk of lime which is a suspension of calcium hydroxide particles ($Ca(OH)_2$), in water, used i.e. for environment cleaning purposes. Milk of lime produced from highly reactive lime will often become lumpy, because it contains large agglomerates of $Ca(OH)_2$ particles instead of many small particles, paradoxically resulting in a less reactive milk of lime, therefore being less applicable for certain purposes.

It has been possible, over a short period, to produce less reactive lime by means of a suspension calciner; but it was not possible to maintain an undisturbed, continuous production, because this requires a higher calcining temperature than the normal 900°–1100° C. in the calciner. Due to this higher temperature the separation cyclone after the calciner will also operate at a higher temperature, entailing that the lime product may become rather sticky and resulting in an accumulation of material in the separation cyclone and clogging of same and a consequential negative influence on production.

It should be mentioned that there are other methods and apparatus for lime burning by which the finished product becomes considerably less reactive, e.g. by burning the lime in rotary kilns or in shaft kilns. Such plants, however, especially rotary kilns, have the disadvantage that the installation costs are considerably higher and the heat economy is considerably lower than for a suspension plant of the type described. Particularly in relation to a shaft kiln, a suspension plant is far easier to start and stop and it is also easier to control temperatures and surplus air and to maintain a constant low loss on ignition of the product. Moreover, a suspension plant is more suitable than other plants to handle, as raw material, lime sand and finer waste products of limestone and to process materials not at all suitable for other types of plants.

SUMMARY OF THE INVENTION

It is the object of the invention to provide for a method for heat treatment of pulverous material, such as lime, in an apparatus of the type mentioned in the introduction so as to obtain a predetermined reactivity of the finished product. According to the invention this is obtained by directing a portion of the material, which is burnt in the first calciner chamber, to the second calciner chamber for additional burning at a higher temperature than in the first chamber, and recirculating this material portion from the second to the first calciner chamber, whereas the remaining portion of the material from the first chamber is conveyed to the cooler.

By conveying a portion of the material from the first calciner chamber for burning at a higher temperature in the second calciner chamber, the result is that the recirculated material will have a lower reactivity and consequently the total product conveyed to the separation cyclone from the first calciner chamber will also have a lower reactivity than without recirculation, and that is without any increased temperature in the separation cyclone and thereby without clogging thereof.

By controlling the portion of recirculated material it is thus possible to control the reactivity of the finished product which is conveyed to the cooler and subsequently control the slaking time and other properties of the burnt lime.

The optimum burning temperature in the first chamber may be in the range 600°–1300° C., whereas the burning temperature in the second calciner chamber may be in the range 800°–1800° C.

The invention also relates to an apparatus for carrying out the above method for heat treatment of pulverous material; the apparatus comprising a preheater, a suspension calciner with two chambers, both provided with fuel inlet, and a separation cyclone equipped with splitting means at its material outlet, and a cooler, the first chamber of the calciner being provided with a material inlet which is connected with the material outlet of the preheater, characterized in that the first chamber has a gas outlet being connected with the gas inlet of the preheater via the separation cyclone, that the splitting means of the separation cyclone is connected both with the cooler and with the second calciner chamber, that the two calciner chambers have a mutual passage for the supply of material/gas suspension from the second to the first chamber, and that the gas outlet of the cooler is connected with the second calciner chamber.

BRIEF DESCRIPTION OF THE DRAWINGS

The invention will now be described in further detail by means of a preferred embodiment of an apparatus according to the invention and with reference to the drawing being diagrammatical and showing in FIG. 1 an apparatus of known design on which the invention is based, and FIG. 2 an apparatus according to the invention.

DESCRIPTION OF THE PREFERRED EMBODIMENT

Figure 1:
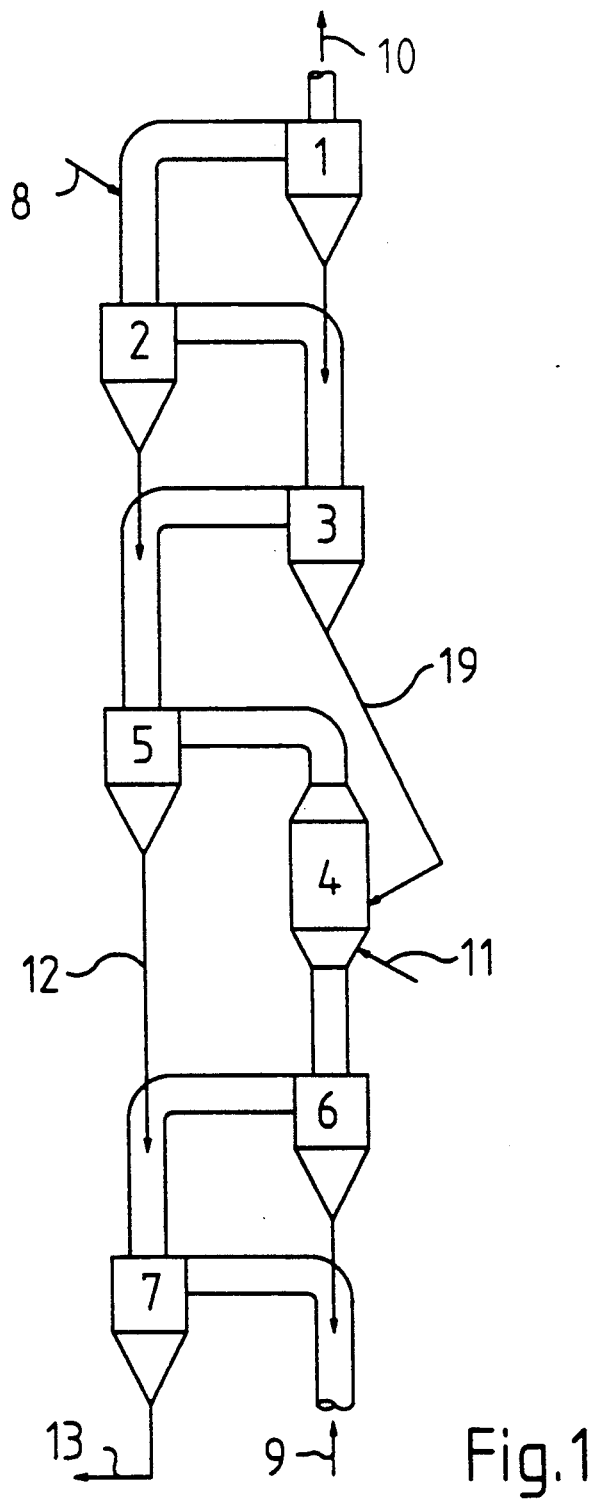

FIG. 1 shows a plant of known design for burning, e.g. lime, and comprising a cyclone preheater, e.g. consisting of three cyclones 1, 2, 3; a so-called Gas Suspension Calciner 4 with a separation cyclone 5, and a suspension cooler, consisting e.g. of two cyclones 6 and 7.

The function of the plant is such that raw lime material is supplied into the cyclone preheater at 8 and passes down through same in countercurrent flow with the ascending exit gas from the calciner 4 in known manner.

Combustion and cooling air enters the plant at 9 and the exit gas leaves the plant at 10 being led to an exit gas filter, not shown, for separation of dust, which subsequently, to a larger or smaller extent, may be returned to the plant either via the raw material inlet 8 or directly to the calciner.

From the lowermost cyclone 3 of the cyclone preheater the material is conveyed via a pipe 19 to the calciner 4 which is also supplied with fuel from a fuel inlet 11. In the calciner 4 the lime is burnt in suspension and the suspension is transported to the separation cyclone 5, in which the burnt lime is separated from the exit gas and directed to the cyclone cooler 6, 7 via pipe 12. From the lowermost cyclone 7 the finish-burnt and cooled lime leaves the plant via a cyclone outlet 13.

Figure 2:
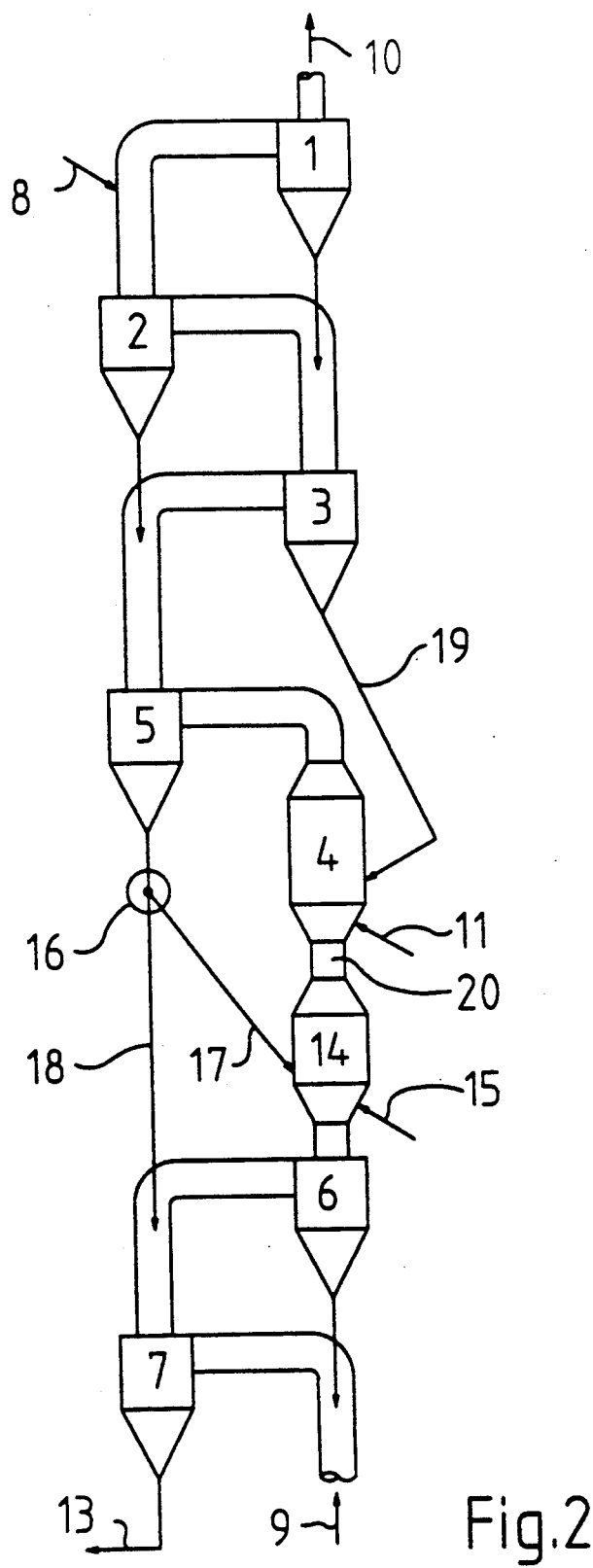

FIG. 2 shows a plant according to the invention and differing from the plant in FIG. 1 by still another calciner chamber 14 having a fuel inlet 15 and being arranged below the calciner chamber 4.

Further, the material outlet from the separation cyclone 5 is provided with a splitting means, e.g. a splitting gate 16 being connected with the second calciner chamber 14 as well as the cyclone cooler 6, 7, as shown with pipes 17 and 18, respectively.

This plant operates in the manner that the material, which is preheated in cyclone preheater 1, 2, 3 is conveyed from the lowermost cyclone 3 via the pipe 19 to the calciner chamber 4, in which the preheated lime is suspended in hot gas ascending from the second calciner chamber 14 and is heated to the temperature, e.g. 1050° C., which is required for calcination ($CaCO_3 \rightarrow CaO + CO_2$). From the chamber 4 the calcined lime is transported to the separation cyclone 5, in which it is separated from the exit gas being directed to preheater 1, 2, 3, whereas the separated lime is directed to the splitting gate 16. The splitting gate 16 divides the calcined lime into two streams. One stream is directed to the second calciner chamber 14, whereas the other stream is led directly to cooler 6, 7. The first stream is suspended in the calciner chamber 14 in the combustion air from the cooler, and here fuel is also supplied from a fuel inlet 15 to obtain a high temperature of e.g. 1300° C. The suspension of lime, being burnt in calciner 14, and exit gas is led through a passage 20 to the chamber 4 where it is mixed with uncalcined lime from the preheater 1, 2, 3.

This arrangement results in a product which is composed of two fractions, namely a first fraction which was subjected to a relatively low temperature in the chamber 4 for a given period of time, and which will be almost completely finish-burnt, i.e. the $CO_2$ content will have been expelled, but the reactivity of which is high, and a second fraction, which after having been calcined in the chamber 4, is directed to the second chamber 14 via separation cyclone 5 and burnt at a relatively high temperature, thereby reducing the reactivity, and is subsequently carried upstream and mixed with the material in the chamber 4.

The portion of burnt lime, which is transported to the cooler 6, 7 from the separation cyclone 5 via the splitting gate 16, and which is discharged from the cooler 6, 7 as a finished product, will consequently contain both fractions so that the finished product will have a lower reactivity than a product which was only burnt in the first calciner chamber 4. Consequently, the setting of the splitting gate 16 determines the reactivity of the finished product.

In conclusion it should be mentioned that the method is not limited to lime burning, but it is also applicable to other processes for carbonates and hydroxides, such as dolomite, magnesite, magnesium hydroxide, aluminum hydrate etc., where it is desirable to be able to influence the reactivity of the product, and also for handling all fine-grained minerals, where a multi-stage or particularly intensive calcination is desirable. Further, the invention may also be used for reburning lime sludges, e.g. for paper mills, where low-reactivity lime is also desirable.

We claim:

1. A method for heat treatment of pulverous material in an apparatus comprising a preheater, a suspension calciner with two chambers and a cooler, by which method the material is preheated in the preheater by means of exit gas from the calciner, burnt in the calciner and cooled in the cooler by air which thereafter is used as combustion air in the calciner, characterized by the steps of passing a first portion of the material which is burnt in the first calciner chamber directly to the cooler, passing a second portion of the material from the first calciner chamber to the second calciner chamber, burning said second portion in the second calciner chamber at a temperature higher than in the first chamber, recirculating the burnt second portion from the second chamber to the first chamber, and controlling the relative proportions of said first and second portions such that the proportion of the finished product which has been subjected to treatment in said second calciner is controlled.

2. A method according to claim 1 characterized in that the burning temperature in the first chamber is held within the range 600°–1300° C., whereas the temperature in the second chamber is held within the range 800°–1800° C.

3. A method according to claim 1, further characterized by the step of passing the material which is burnt in the first calciner chamber to a splitting means, and passing the first portion from the splitting means to the cooler, and the second portion from the splitting means to the second calciner chamber.

4. A method according to claim 3 wherein the relative proportions of said first and second portions are controlled by said splitting means.

5. An method according to claim 1, wherein the pulverous material is lime, said method being further characterized in that the reactivity of the finished product is controlled by controlling the relative proportions of said first portion and said second portion.

6. An apparatus for the heat treatment of pulverous materials such as lime comprising,
   a preheater, a suspension calciner having first and second chambers each provided with a fuel inlet, said calciner being connected to the preheater such that combustion gases are passed from the calciner through the preheater counter-current to the material being passed through the preheater to the first chamber of the calciner, a cooler for receiving burnt material from the first chamber of the calciner, a separator arranged between a gas-material outlet of the first calciner chamber and the cooler, said separator adapted to separate the gas and material which exits from the first chamber and to pass the gas to the preheater, and to pass the material to a splitting means, said splitting means arranged to split the material into first and second portions and to pass the first portion directly to the cooler and to pass the second portion to the second calciner chamber, said splitting means being adapted to control the relative proportions of said first and second portions, said second calciner chamber having a gas-material outlet adapted to pass gas and material burned therein to said first calcining chamber.

* * * * *